Nov. 20, 1923.
H. O. STAMP
1,474,855
CONVEYING APPARATUS
Original Filed Feb. 9, 1920    7 Sheets-Sheet 1
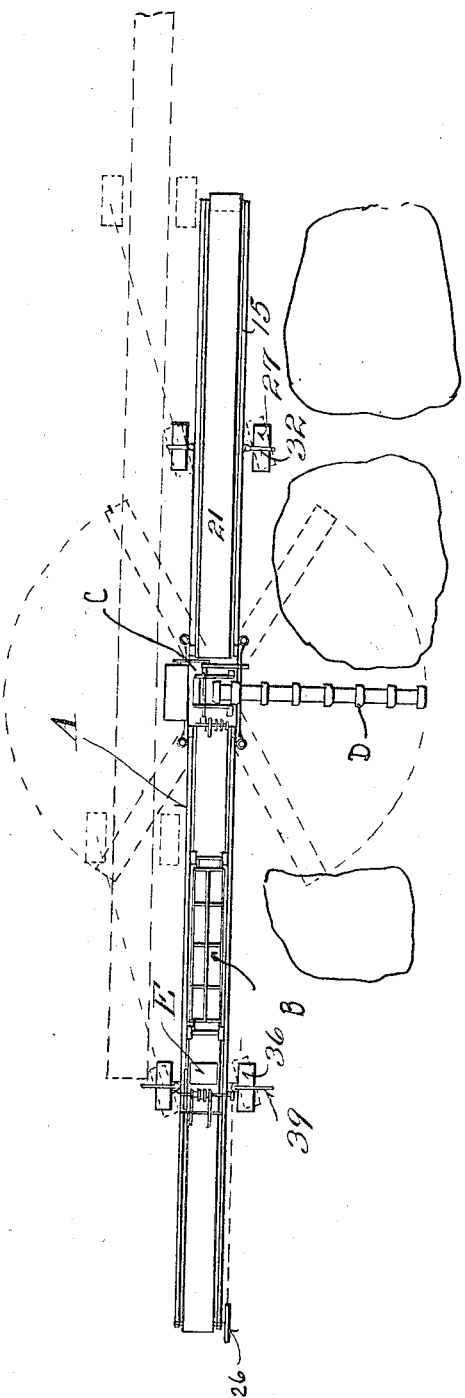
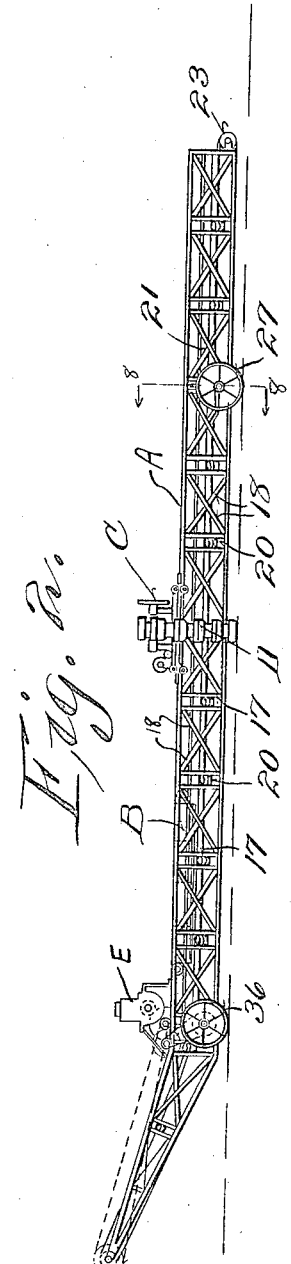

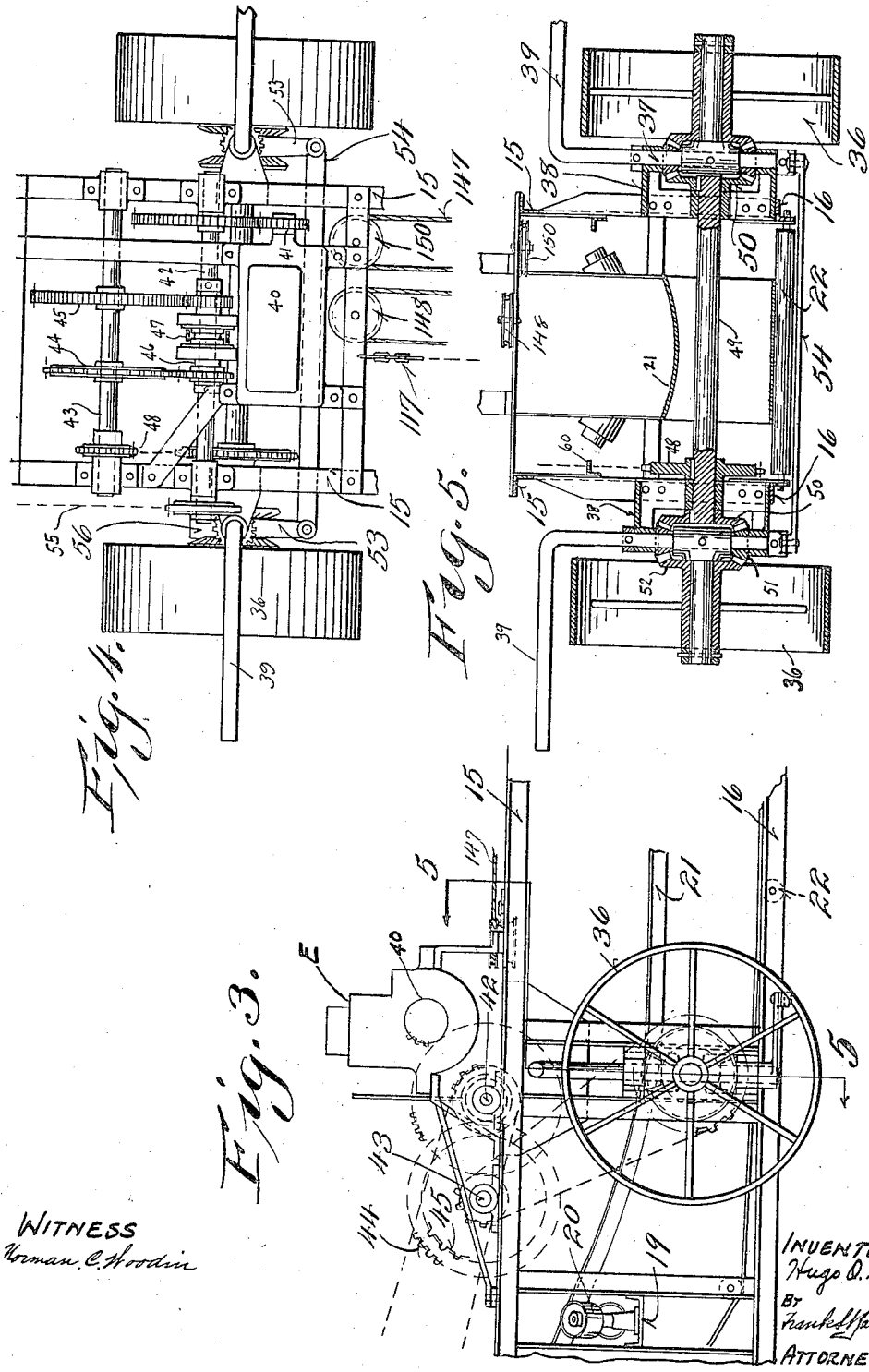

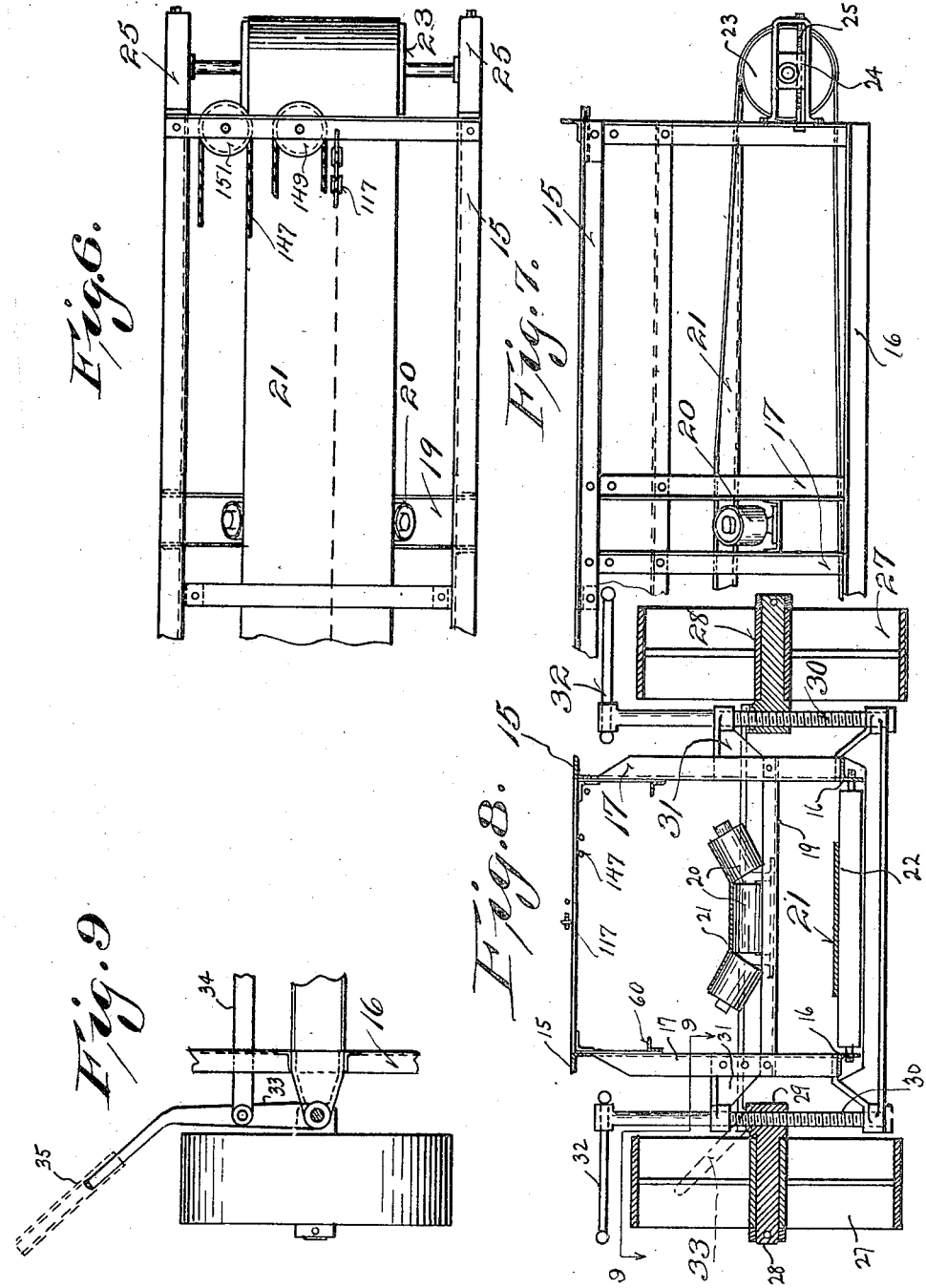

Nov. 20, 1923.
H. O. STAMP
1,474,855
CONVEYING APPARATUS
Original Filed Feb. 9, 1920   7 Sheets-Sheet 4
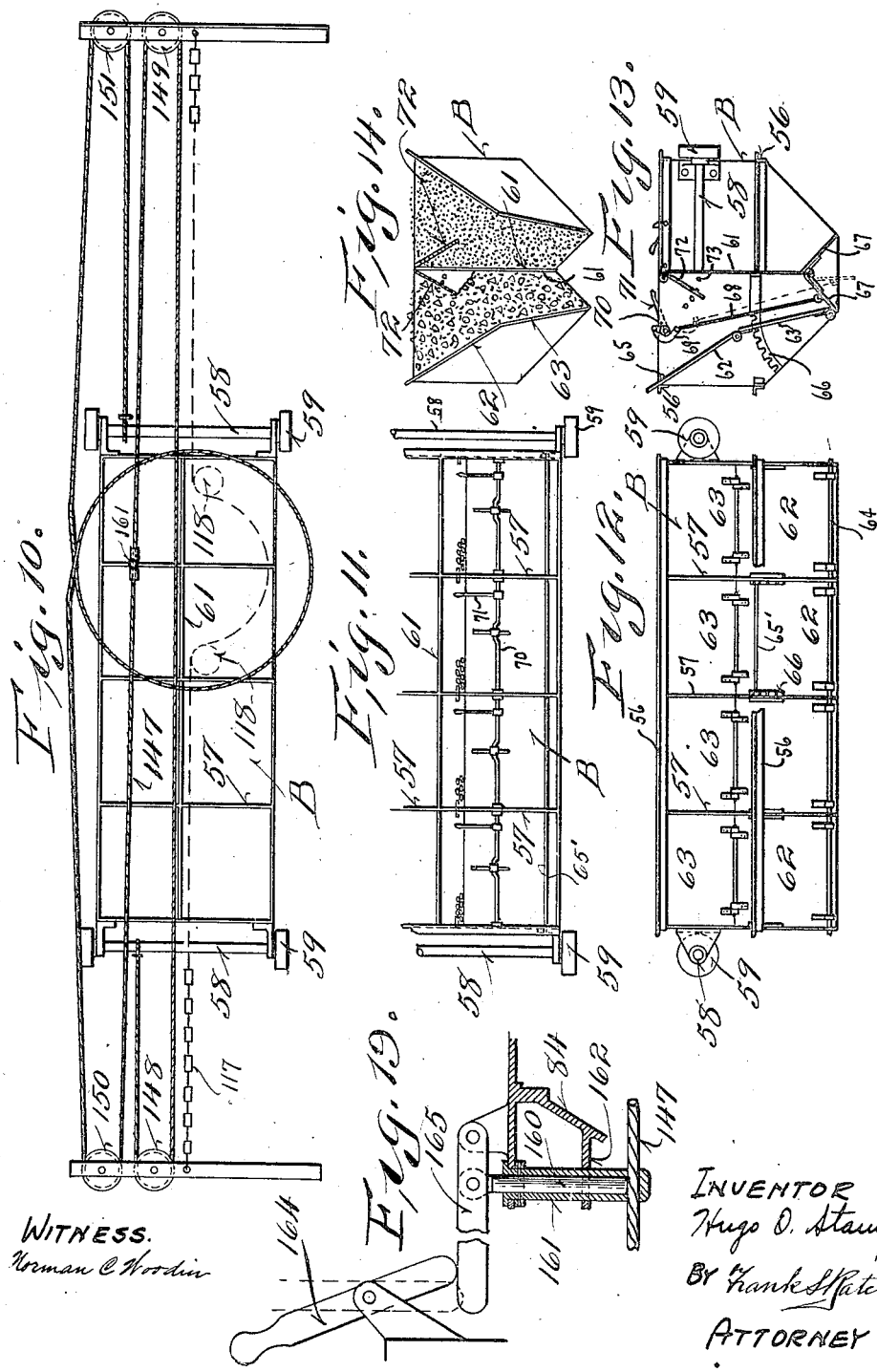

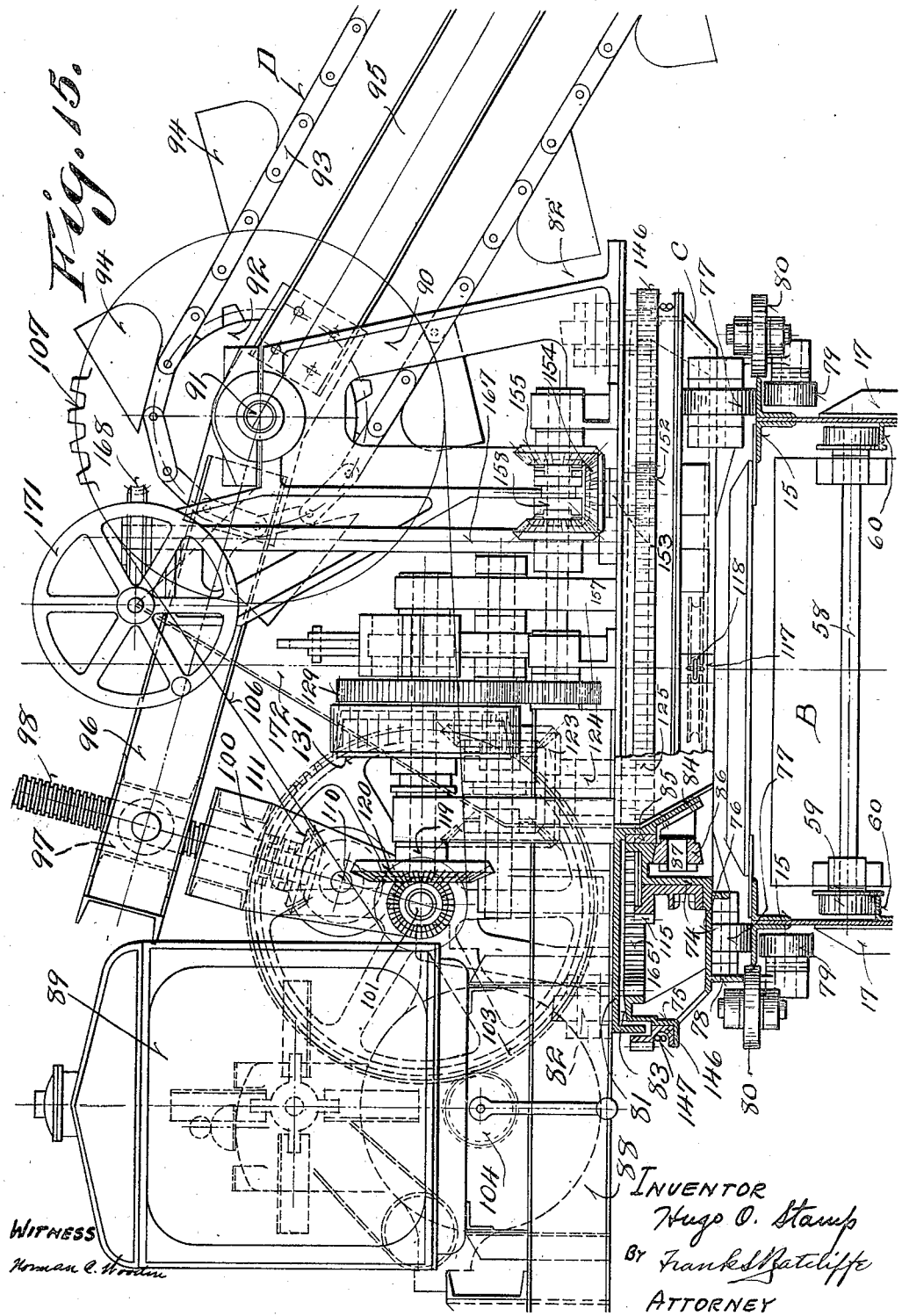

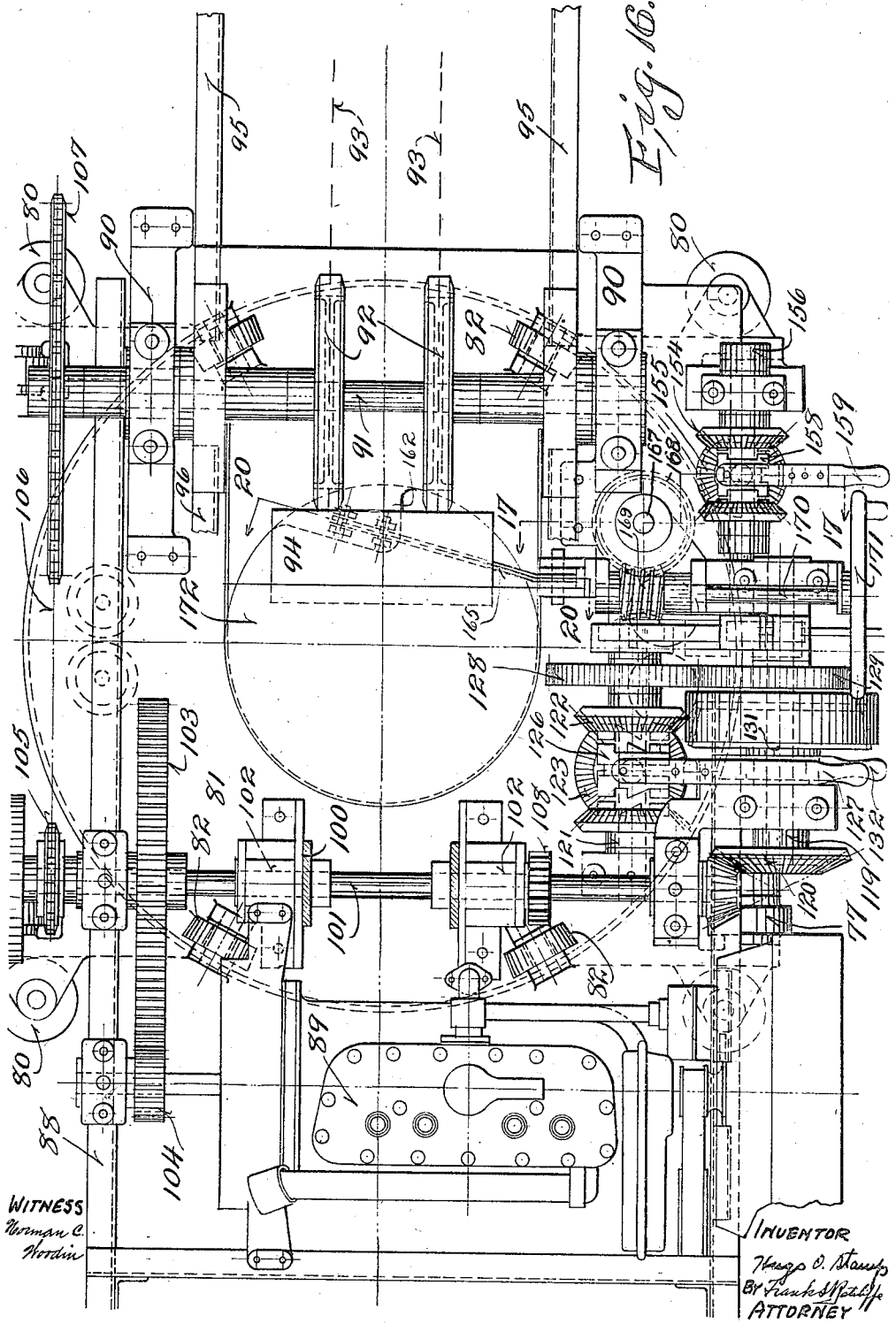

Nov. 20, 1923.
H. O. STAMP
CONVEYING APPARATUS
Original Filed Feb. 9, 1920   7 Sheets-Sheet 7
1,474,855
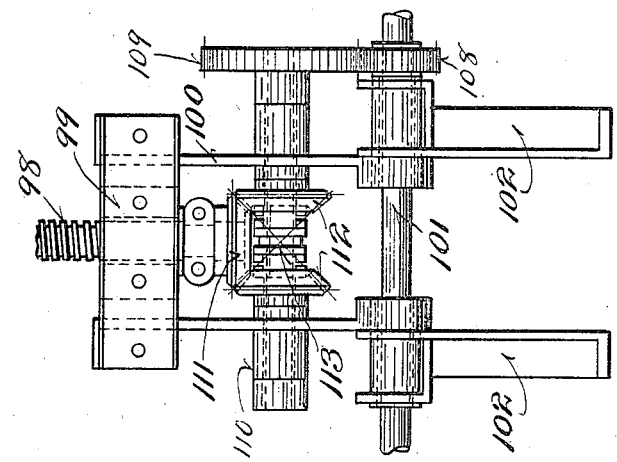
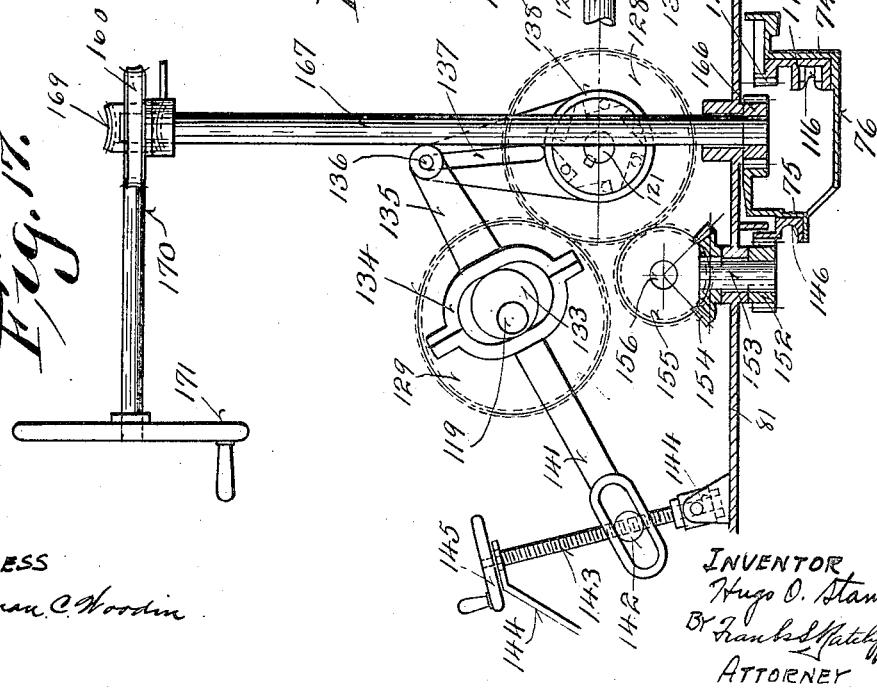
WITNESS
Norman C. Woodin
INVENTOR
Hugo O. Stamp
By Frank S. Ratcliffe
ATTORNEY Patented Nov. 20, 1923.

1,474,855

UNITED STATES PATENT OFFICE.

HUGO O. STAMP, OF MILWAUKEE, WISCONSIN, ASSIGNOR TO THE STAMP MACHINE COMPANY, OF MILWAUKEE, WISCONSIN.

CONVEYING APPARATUS.

Application filed February 9, 1920, Serial No. 357,170. Renewed October 17, 1923.

*To all whom it may concern:*

Be it known that I, HUGO O. STAMP, a citizen of the United States, and resident of Milwaukee, in the county of Milwaukee and State of Wisconsin, have invented certain new and useful Improvements in Conveying Apparatus; and I do hereby declare that the following is a full, clear, and exact description thereof.

My present invention relates to new and useful improvements in conveying apparatus wherein portions are relatively movable for operation at different points along the apparatus with respect to the piles of material to be conveyed, and the invention is more particularly directed to the provision of a loading machine adapted for use in connection with concrete mixers and which is of the general type embodied in my previous Patent No. 1,290,797, issued January 7th, 1919, wherein there is provided a main longitudinal conveyor means and lateral pick-up conveyor means movable along the main longitudinal conveyor means and arranged to discharge into a measuring device disposed over the main conveyor means.

It is in general the object of my invention to simplify and otherwise improve the structure of machines of this type and to increase the efficiency thereof, both with respect to the actual conveying operations and with respect to the manipulation of the machine and parts thereof to procure its proper relation to the piles to be conveyed, it being appreciated that the present machine is adapted to meet the general problem of conveying material to the mixer from piles of sand and gravel which are distributed along the roadway in more or less uniform manner with respect to the relative proportions of such materials, which constitute the concrete aggregate, it being necessary that the materials be supplied to the mixer in definite proportion, and as set forth in my said previous patent, a maximum range of the operation of the device along the roadway is necessary to properly compensate for variations in the layout of the piles of material, this maximum range of operation of the conveying functions of the machine also finding particular value in stationary concreting jobs by reason of the storage area over which the machine may operate without bodily shifting thereof.

It is more particularly an important object of my invention to provide a pick-up conveyor means which may be moved over the main longitudinal conveyor of the machine for operation selectively at either side thereof, whereby a single pick-up conveyor unit may suffice to procure operation of the machine with respect to piles disposed longitudinally along both sides thereof.

A further object resides in the provision of a lateral pick-up conveyor mechanism movable along the main longitudinal means for conveying and including a traveling carriage mounted on the frame of said longitudinal means for conveying and carrying controls for the operation of the pick-up conveyor and measuring mechanisms of the machine, whereby an operator mounted on said carriage may conveniently and accurately control the operation of the entire machine with respect to its pick-up and measured discharge functions.

A further important object resides in the provision of a lateral pick-up conveyor mechanism which is independent of the drive means of the main conveyor, whereby to facilitate manipulations of the lateral conveyor means with respect to the main conveyor for pick-up engagement with piles of material disposed at any points along the main longitudinal conveyor.

A further important object resides in the provision of an arrangement wherein the lateral pick-up conveyor means may be utilized to selectively fill each of a series of measuring hoppers disposed over the main longitudinal conveying means of the machine, whereby to materially increase the flexibility of operation of machines of this character by reason of the fact that the lateral pick-up conveyor means may be utilized to fill a succeeding hopper while the previously filled hopper is being held for discharge incidental to the operation of the concrete mixer device, thus providing a means of compensation for intermittent variations in the operation of either the concrete mixer or the conveying machine.

A still further object in this connection resides in the provision of means for mechanically procuring movement of the measuring hoppers and pick-up conveyor means, either independently or simultaneously in predetermined relation.

A still further object with respect to the measuring hoppers resides in the provision of a hopper carriage having adjustable hopper compartments so located as to discharge in maximum proximity to the conveyor belt. A more detailed object in connection with the hoppers resides in the provision of means for procuring different effective capacities of the hoppers for materials of different degrees of fineness, whereby relatively fine adjustments of the amounts of sand and gravel discharged therefrom to the main conveyor means may be effected without the necessity of independently adjusting the hopper compartments for sand and gravel.

A still further object with respect to the hopper structure resides in provision of an arrangement whereby the lateral pick-up conveyor means simultaneously fills a plurality of measuring hopper compartments, so that a relatively large number of hopper compartments may be most conveniently and rapidly filled to facilitate the desired proportioning of the sand and gravel upon its discharge to the main means for conveying.

With the above and other objects and advantages in view, my invention resides more particularly in the novel combination, formation and arrangement of parts hereinafter described and particularly pointed out in the appended claims.

In the accompanying drawings:

Figure 1 is a plan view of one embodiment of my improved loading machine, with the major parts thereof shown in partly diagrammatic manner;

Figure 2 is a side elevational view of the machine;

Figure 3 is a side elevational view of the main power unit of the machine and associated structure;

Figure 4 is a plan view of what is shown in Figure 3;

Figure 5 is a vertical sectional view through the machine on planes indicated by the broken line 5—5 of Figure 3;

Figure 6 is a plan view of the forward end portion of the machine;

Figure 7 is a side elevational view of the forward end portion of the machine;

Figure 8 is a sectional view through the forward supporting wheel structure of the main frame, on a plane indicated by the line 8—8 of Figure 2;

Figure 9 is a detail plan view of the means for steering the front wheels;

Figure 10 is a plan view of the table layout for shifting the hopper and pick-up conveyor carriages;

Figure 11 is a plan view of one side portion of the hopper carriage;

Figure 12 is a side elevational view of the hopper carriage;

Figure 13 is a view partly in end elevation, and partly in section, of the hopper carrier;

Figure 14 is a diagrammatic sectional view through a pair of transversely opposed hoppers;

Figure 15 is a view taken transversely through the upper portion of the body frame of the machine, and showing the pick-up conveyor carrier and turn-table in elevation, with portions of this structure broken away;

Figure 16 is a plan view of what is shown in Fig. 15;

Figure 17 is a sectional view showing the inching feed mechanism of the pick-up conveyor carriage on a plane indicated by the the line 17—17 of Fig. 16;

Figure 18 is a detail sectional view showing means for adjusting the vertical angularity of the pick-up conveyor; and Figure 19 is a detail sectional view of the cable clamp for the pick-up conveyor carriage, on a plane indicated by the line 19—19 of Fig. 16.

Figure 20 is a detail sectional view through the inching feed cluth.

Referring now more particularly to the drawings, I provide, as in my aforementioned patent, an elongated main conveyor frame A, having wheeled support at its front and rear end portions, this conveyor frame being adapted to lie close to the ground and being only of sufficient height to provide proper clearance for the pick-up and measuring mechanisms associated therewith. A hopper carriage B is longitudinally movable within the upper portion of the frame, and a carriage C is movable over the frame and over the hopper carriage and has mounted thereon a lateral pick-up conveyor D which is adapted to extend downwardly at either side of the main conveyor carriage to engage piles of material disposed therealong on the ground, said conveyor D being movable over the conveyor frame A whereby to selectively procure its position at either side thereof. A power mechanism E is mounted on a rear portion of the frame A for driving the main conveyor and for propelling the entire machine, and a wholly independent power mechanism is mounted on the pick-up conveyor carriage for driving said pick-up conveyor and for procuring desired movements of the pick-up conveyor and hopper carriages.

The main frame A may be of any desired nature to provide proper support for a longitudinal conveyor and to provide trackways for the carriages movable thereover. In the present instance said frame is formed of upper and lower pairs of angle iron side sills 15 and 16 respectively, said sills being connected at spaced intervals by pairs of spaced vertical bars 17 and by crossed bars 18 extending between the pairs of bars 17. Channeled cross bars 19 have their ends secured to bars 17 and these bars 19 carry rollers 20 of preferably conventional nature for supporting the upper stretch of a main conveyor belt 21. The lower or return stretch of this belt rests on rollers 22 at the bottom of the frame. At the forward end of the frame, the belt is trained about a roller 23, which has its pintles journalled in sliding bearing blocks 24 which are adjustably mounted in boxes 25 whereby the tension of the belt may be readily adjusted. The sills are inclined upwardly in convergent relation at the rear end portion of the frame, and the adjacent portions of the belt stretches are correspondingly inclined, whereby the discharge of the belt is effected at a sufficiently high point to properly load into the skip of a concrete mixer, the end of the belt being trained about a driven roller 26.

An adjustable wheeled support is provided for the forward end portion of the main frame, and comprises a pair of wheels 27 mounted on spindles 28 carried by sleeves 29 which are threaded on screw shafts 30 journalled in bearing brackets 31 outstanding from the sides of the frame. The upper ends of the screw shafts are extended above the wheels and are headed to slidably receive handle bars 32, whereby the shafts may be rotated to raise or lower the forward end portion of the frame with respect to its wheeled support. A pair of steering arms 33 extend rearwardly from the spindle sleeves 29 and are connected by a link 34 whereby steering movement of the wheels is effected in unison, one of said arms 33 being extended rearwardly of the adjacent wheel and then inclined outwardly whereby it may be engaged by tubular handle member 35. The forward end portion of the machine may thus be steered in travel thereof by a person walking alongside of the machine and grasping said handle.

The rear end portion of the machine is supported by a pair of wheels 36 mounted on steering spindles 37, said spindles being journalled in yoke castings 38 secured to and outstanding from the sides of the frame. The upper ends of the spindles are extended above the wheels and directed outwardly to provide steering handles 39. The drive mechanism E for the wheels includes an engine 40 mounted on the frame preferably above the wheels, and this engine has gear connection 41 with a countershaft 42 mounted transversely on the adjacent portion of the frame. A second countershaft 43 is also mounted on the frame and this second countershaft has differential gear connections 44 and 45 respectively with sleeves 46 loosely mounted on a shaft 42, a clutch mechanism 47 being mounted on the shaft 42 between the sleeves for imparting a selective drive, this structure being conventional in general nature and hence not specifically shown. The shaft 43 has sprocket connection 48 with a shaft 49 mounted between stretches of the main conveyor belt 21, with its ends journalled in the yoke members 38. Gears 50 are fixed on the ends of the shafts 49 and mesh with pinions 51 which are loose on steering spindles 37, said pinions in turn meshing with gears 52 on the hubs of the wheels 36. Thus a continuous drive is afforded for the wheels irrespective of their steering movement, the steering spindles being connected in the usual manner for simultaneous movement by arms 53 in pivotal union with a transverse link 54. The belt 21 is driven continuously upon operation of engine 40 by a chain and sprocket connection 55 between the shaft 42 and the rear end roller 26 about which the belt is trained under control of the clutch 56'.

The hopper carriage B comprises a frame work which is formed in the present instance of upper and lower pairs of sills 56 which carry a series of transverse partition plates 57, said plates being of such a width as to extend substantially the entire distance between the sides of the main frame A, and extending from the upper stretch of the belt 21 to approximately the top of the main frame. Axle shafts 58 are secured at the ends of the carriage frame and carry rollers 59 which ride on tracks 60 carried by the sides of the main frame adjacent to top of the main frame, it being noted that the major portion of the hopper structure is disposed below the support rollers 59. A central partition 61 extends longitudinally through the carriage frame and forms the dividing wall for opposed pairs of hopper compartments. The outer wall of each of these compartments is adjustable in nature to thus adjust the capacity of the compartment, and hence comprises upper and lower hingedly connected sections 62 and 63 respectively, each outer wall being movable between a pair of transverse partition plates 57. The lower edge of each wall section 63 is hinged at the bottom of the hopper structure on a longitudinally extended shaft 64, and the upper edge of each wall section 62 is slidably engaged between the adjacent upper frame sill 56 and an inwardly disposed guide rod 65. The intermediate portion of the wall may thus be moved inwardly or outwardly to effect a substantial variation of the hopper capacity, and the sections of each wall are held in desired position by rods 65' having their ends engaged in arcuate racks 66 carried by the transverse plates 57. Dump bottoms for the hopper compartments are provided in the form of plates 67 hinged at the lower edge of the central partition 61, and it is noted that the lower edge of the partition 61 is spaced above the lower edges of the adjustable hopper sidewalls, whereby the bottom plates 67 are inclined in closed position and will move downwardly a minimum distance to procure their open position, thus permitting a maximum closeness of the hopper bottoms to the main conveyor belt. The hopper bottoms are held in closed position by links 68 pivoted thereto and pivoted to arcuate members 69 which are in turn pivoted to intermediate crank portions of shafts 70 mounted at the mouth portions of the hoppers, said shafts carrying handles 71 whereby they may be rocked to procure swinging movement of the hopper bottom plates 67, it being noted that when the hopper bottoms are closed the connection of the arcuate members with the crank shaft portions move past the axis of the shaft to procure a locking arrangement which holds the hopper bottom in closed position.

As will be later explained in detail, the pick-up conveyor D is adapted to simultaneously fill pairs of transversely opposed hopper compartments with aggregate material, either sand or gravel and these materials are measured by the capacity of the hopper compartments for discharge onto the main conveyor belt in definite quantities and proportions, which may be carried to meet different requirements. When the proportion of sand to gravel required is two to one, it is merely necessary to dump two hopper compartments of gravel and one of sand, and the hoppers may be indiscriminately used for measuring either ingredient. When, however, the proportion is one and one-half to two, for instance, a different condition rises, inasmuch as the proportions cannot be procured by multiples of a single hopper capacity. To provide for accurate and convenient measuring under these conditions, a plate 72 is hinged within each hopper compartment, preferably adjacent the upper edge of the central partition 61, these plates being perforate in nature whereby to freely admit sand through their perforations, but to exclude the passage of gravel thereto. These plates may be held at varying angles within the hopper compartment by support pins selectively engageable in socket openings 73 in the transverse partition walls 57. Consequently, when the plate 72 of the hopper compartment is inclined outwardly, and gravel is discharged into said compartment, a space will be left between the plate 72 and central partition wall 61, which will reduce the effective capacity of the hopper compartment with respect to gravel, but when sand is discharged into a compartment having a similarly adjusted plate 72, the compartment will be completely filled with sand by reason of passage of the sand through the apertures of the plate, and this relative difference in the volumes of similarly adjusted compartments for sand and gravel serves to provide for procuring the finer desired proportions of sand and gravel without requiring independent adjustments of the hopper compartments for this purpose, whereby sand or gravel may be discharged indiscriminately into opposed pairs of hopper compartments, it being appreciated that in Figure 14 sand and gravel are shown in transversely opposed hopper compartments merely for the purpose of exemplifying the functions of the supplemental adjusting plates 72.

Taking up now the structure of the pick-up conveyor D and its support carriage which travels on the main conveyor frame A, said carriage C comprises in the present instance an annular body casting formed of inner and outer wall portions 74 and 75 respectively, which are connected at their lower edges by an annular base portion 76, said base portion having rollers 77 mounted thereunder which ride on the upper angle iron sills 15 of the main conveyor frame. This base portion 76 of the body casting is also provided at its outer periphery with a depending flange 78 which carries brackets for series of rollers 79 and 80 respectively, which engage the under faces of the outturned portions of the sills 15 and engage the outer edges of the sills, thus providing a roller engagement of the pick-up conveyor carriage with the main conveyor frame under all of the conditions of stress which may be imparted to said carriage. An annular turntable 81 is mounted over the carriage body, said table having rollers 82 mounted at its peripheral portions which project through the table and ride on an inturned upper flange portion 83 of the outer wall portion 75 of the carriage body. The inner periphery of the turntable carries a depending section 84 which extends downwardly into the carriage body, a wear ring 85 being inserted between the section 84 and the inwardly offset upper portion of the inner carriage body wall 74. Rollers 86 are carried by outwardly projecting bearings 87 on the lower portion of the turntable section 84, and these rollers are engageable with the under surface of the offset portion of the body wall 74 to provide a bearing meeting tilting stresses which may be imparted to the turntable by the action of the pick-up conveyor.

A suitable frame work 88 is mounted on the turntable for supporting an internal combustion engine 89, or other prime source of power at one side of the turntable, and for supporting at the diametrically opposite side of the turntable a pair of standards 90, in the upper ends of which is journaled a drive shaft 91 which carries a pair of sprocket wheels 92 for the chains 93 of a bucket conveyor, the usual series of buckets 94 being extended between and carried by these chains. At the outer or work receiving end of the conveyor, the chains are trained in the usual manner about sprocket wheels (not shown), which are carried by the outer ends of a pair of conveyor frame bars 95 having pivotal mountings on the conveyor drive shaft 91. The conveyor is held in desired vertical angularity by arms 96 extending inwardly over the turntable from the pivotal connections of the frame bars 95, and carrying a pivotally connected nut block 97 which is mounted on a screw 98 upstanding from the bight portion 99 of a yoke member 100 which has its legs pivoted on a drive shaft 101 journaled in bearings 102 upstanding on the turntable. This shaft 101 constitutes the main countershaft for the various drive mechanisms hereinafter to be described and extends parallel to the engine 89, being driven by a gear 103 meshing with a pinion 104 on the engine shaft. One end of the shaft 101 carries a sprocket pinion 105 connected by conventionally shown chain 106 with a sprocket wheel 107 on the pick-up conveyor drive shaft 91. The countershaft 101 also serves to actuate the screw 98 for raising or lowering the pick-up conveyor, and thus, a pinion 108 is fixed on said shaft and meshes with a gear 109 fixed on a shaft 110 which is journaled in the arms of the screw yoke 100. The unthreaded lower end of the screw 98 extends through and is journaled in the bight 99 of the yoke and carries a pinion 111 meshing with a pair of pinions 112 loosely mounted on the shaft 110 and having clutch portions selectively engageable by a conventionally shown clutch member 113 splined on the shaft therebetween.

Describing now the power driven means for causing the pick-up conveyor carriage C to travel along the main frame in whichever rotative position the turntable 81 may assume, in the present construction, a sheave annulus 114 is rotatively disposed about the inner wall portion 74 of the carriage body, said annulus having a series of gear teeth 115 at its upper portion and having lugs 116 on its lower peripheral portion adapting for interlocking engagement with the links of a track chain 117 which extends longitudinally at the upper portion of the main conveyor frame throughout the path of travel of the carriage. The sheave engaging portion of said chain extends, in the present instance, about half of the periphery of the sheave member, and is guided for such engagement by rollers 118 disposed at the front and rear portions of the carriage body, under the turntable. For driving the sheave 114, a countershaft 119 is mounted on the turntable frame, having bevelled gear connection 120 with the main countershaft 101, and said shaft 119 has variable speed connection with the shaft 121 journaled at one side thereof and having loosely mounted thereon a pair of beveled gears 122 meshing with a beveled gear 123 carried on a shaft 124 which is journaled in the turntable and which carries at its lower end a pinion 125, as shown in dotted outline in Fig. 15, and meshing with the gear teeth 115 of the sheave. A clutch member 126, controlled by lever 127, is splined on the shaft 121 between the pinions 122 and is selectively engageable therewith to effect the drive rotation of the sheave in either direction and thus procure propulsion of the carriage C in either direction.

The variable speed connection between the shaft 119 and the shaft 121 comprises a direct high speed drive and a variable inching drive to procure a gradual automatic feeding movement of the pick-up conveyor during its conveying operation, the direct high speed drive serving to quickly move the conveyor and carriage along the frame to the desired points of work. The high speed drive is effected by a gear wheel 128 on the shaft 121 which meshes with a gear wheel 129 which is loose on the shaft 119 and which carries a female clutch member engageable by a clutch cone 131 splined on the shaft 119 and controlled in conventional manner by a clutch lever 132.

The drive mechanism for inching or gradually moving the conveyor and carriage along during the conveying operation, comprises a cam 133 mounted in the slot of a slide member 134 from one side of which extends an arm 135, carrying a pintle 136 engaged in the longitudinal slot of a slotted crank arm 137, which is carried on a clutch annulus 138 disposed about a clutch hub 139, keyed on the shaft 121. Ball clutch members 140 are disposed between inclined face portions of the hub and annulus whereby to procure rotative step movement of the shaft 121 in one direction of movement of the crank carrying clutch annulus 138. An arm 141 projects from the opposite side of the slide member, and the outer end portion of the arm 141 is longitudinally slotted for sliding connection with an adjusting nut 142 which is threaded on a slightly inclined screw 143, having suitable bearing supports 144 and adapted to be rotated by hand wheel 145 on its upper end. Thus, upon rotating the screw, the cam slide and its arms will be rotatively adjusted about the cam 38, thus varying the leverage of the crank arm 137 by sliding the pinion 136 in the slot of said arm, and consequently adjusting the degree of movement effected by the mechanism.

To procure movement of the hopper carriage B, either simultaneously with or independently of the pick-up conveyor carriage C, a cable sheave is rotatively carried by the conveyor carriage body, constituting in the present instance an annulus 146 disposed about the outer wall portion 75 of the carriage body. A cable 147 is secured at one end to an end of the hopper carriage B, and is then extended to the adjacent end of the main conveyor frame, and then trained about a pulley 148, and then extended the entire length of the path of travel of the carriages, and then trained about a pulley 149, and extended again through the entire length of the path of travel, the cable being then trained about a third pulley 150 adjacent the pulley 148, and extended reversely and wound about the sheave 146, being extended therefrom to the other end of the path of travel and trained about a fourth pulley 151 adjacent the pulley 149, and finally secured at its other end to the other end of the hopper carriage. For driving the sheave 146, a series of gear teeth are formed thereon, which mesh with the teeth of a pinion 152 carried by the lower end of the shaft 153, which is journaled in the turntable and which carries at its upper end a beveled gear 154, meshing with beveled gears 155 loosely mounted on a shaft 156, which is driven by a pinion 157 meshing with the drive gear 128 of the shaft 121. A clutch member 158, controlled by lever 159 is splined on the shaft 156 between the beveled gears 155 for driving the sheave in either direction, free rotation of the sheave being permitted when the clutch is in neutral position.

Thus, when the sheave is free, one stretch of the cable may be clamped to the pick-up conveyor carriage, and the hopper carriage will be thus caused to travel simultaneously with the conveyor carriage upon driving the latter. This clamping action is effected when desired by a plunger 160, which is slidable in a sleeve member 161 through lower portion of which is passed one of the longitudinal stretches of the cable 147, said sleeve member being carried by and depending from bearings 162 projecting from the inner depending section 84 of the turntable. The plunger is depressed by a lever 163 pivoted thereto and pivoted at one end to the turntable, the other end of the lever being engageable by the lower end of an intermediately pivoted upwardly extending handle lever 164 to procure clamping depression thereof.

For rotating the turntable, an internal gear ring 165 is carried by the upper portion of the outer wall 75 of the pick-up conveyor carriage, and constitutes a drive track for a pinion 166 which meshes therewith and is carried on the lower end of a vertical shaft 167 journaled in and extending above the turntable, and carrying on its upper end a gear 168 meshing with a worm 169 carried on a shaft 170 which is adapted to be rotated by hand wheel 171 thereon.

This turntable rotating means serves to procure the various desired positions of the turntable for operation of the conveyor selectively at either side of the main conveyor frame, and in either direction along the main conveyor frame. When the pick-up conveyor is operating against a pile, and fed theretoward by the inching feed mechanism on the turntable, there exists a tendency for the conveyor to swing horizontally outward, and this outward tendency of movement is utilized to pick up the material from a pile in slices extending transversely of the pile, the turntable rotating means serving in this operation as a manual hold back control for this tendency of swinging movement of the conveyor, whereby the operator may allow the conveyor to shift outwardly in accordance with the desired rate of feeding. The conveyor may thus be reciprocated across the end of a pile to effect a conveying operation on the pile in a convenient manner, or the conveyor may operate against the pile in a longitudinal line, to meet the particular requirements which would be encountered.

The pick-up conveyor discharges centrally through the turntable and is thus, in the present instance, adapted to simultaneously fill a pair of transversely opposed hoppers, although means may be provided for particularly directing the flow of material from the pick-up conveyor. In the present structure, a hood 172 rises from a central portion of the turntable and surrounds the opening thereof to deflect material from the pick-up conveyor through said opening.

Summarizing the entire foregoing description, it will be seen that I have thus provided a fairly simple and exceedingly efficient machine for picking up, measuring and conveying the aggregate material, which is effectively operative under numerous conditions of work, and which requires a minimum amount of manual labor in conjunction with the operation thereof. Simplicity of structure with respect to the drive means of the machine is effected particularly by the provision of independent power units for procuring the operation and propulsion of the main conveyor means and its related parts, and the operation and independent propulsion of the pick-up conveyor and its related parts.

In the general operation of my machine, the aggregate may be laid out in various manners to meet the particular conditions involved, and if desired the sand and gravel may be laid out in opposite piles along the roadway, thus being kept entirely separate, and the machine may operate therebetween, the pick-up conveyor being swung over the main conveyor frame when it is desired to change the loading operation of the hoppers from sand to gravel, and by reason of the multiplicity of hoppers provided and the independent relative movement of the pick-up conveyor, a maximum flexibility of operation is assured by reason of the fact that a plurality of hoppers may be filled at one time to compensate for intermittent conveying or discharge operations. If desired, the sand and gravel may be disposed in piles at one side of the road, the pick-up conveyor operating only at whichever side the piles are located, and the other side of the road may thus be left open for traffic in bringing up emergency supplies, or for other purposes. In stationary concreting operations, the pick-up conveyor may operate selectively at either side, thus covering a very wide area and said pick-up conveyor may extend beyond the end of the main conveyor to further increase the area covered.

While I have shown and described a preferred embodiment of my invention, it will be appreciated that various changes and modifications of structure and arrangement may be employed to meet different conditions of use, and that various phases of the invention may be used independently without departing in any manner from the spirit of my invention as defined by the appended claims, and while, in the present machine, I have shown the main longitudinal means for conveying as comprising a conveyor belt extending throughout the length of the main elongated frame of the machine, said main means for conveying may constitute any elongated arrangement whereby the transportation of the work material is effected from the selected position of the pick-up conveyor to the discharge point of the machine.

What I claim as my invention is:

1. A machine of the class described, including an elongated wheeled frame, a longitudinally extending main means for conveying carried by said frame, a power unit carried by the frame for propelling said frame and driving said main means for conveying, a carriage movable there-along, a turntable on said carriage, a pick-up conveyor carried by said turntable and arranged to discharge to said main means for conveying, and an independent power unit mounted on the turntable for driving said pick-up conveyor and propelling said carriage along the main means for conveying.

2. A machine of the class described, including an elongated wheeled frame, a longitudinally extending main means for conveying, a carriage movable there-along, a turntable on said carriage, a pick-up conveyor carried by said turntable and arranged to discharge to said main means for conveying, a primary power unit mounted on the turntable for driving said pick-up conveyor, and means operated by said power unit for propelling the carriage along the main means for conveying.

3. A machine of the class described, including an elongated main means for conveying, a carriage movable there-along, a shaft mounted on the carriage, a pick-up conveyor having its discharge end portion pivotally mounted on the shaft, an arm extended from said discharge end portion of the pick-up conveyor, a second shaft mounted on the carriage, a bearing member pivoted on the second shaft, a screw journaled in the bearing member and having threaded connection with said pick-up conveyor arm, and a drive connection between said second shaft and the screw.

4. A machine of the class described, including an elongated main means for conveying, a carriage movable there-along, a shaft mounted on the carriage, a pick-up conveyor having its discharge end portion pivotally mounted on the shaft, an arm extended from said discharge end portion of the pick-up conveyor, a main drive shaft mounted on the carriage, a yoke member having its legs pivoted about the second shaft, a screw journaled in the bight member of the yoke and having threaded connection with the said pick-up conveyor arm, a shaft journaled in the arms of the yoke and having drive connection with the said drive shaft, and a reverisible drive connection between the last named shaft and said drive shaft.

5. A machine of the class described including a main longitudinal means for conveying, a carriage movable therealong, a pick-up conveyor arranged to discharge to the main means for conveying and pivotally connected with the carriage for movement to extend at an acute angle to the main means for conveying in either direction from its point of connection with the carriage to procure its pick-up operation in either direction of movement along the main means for conveying, and a primary power means on the carriage for driving said pick-up conveyor and for propelling said carriage along the main means for conveying.

6. A machine of the class described including a main longitudinal means for conveying, a carriage movable therealong, a pick-up conveyor having pivotal connection with the carriage for horizontal swinging movement, means for procuring inching movement of the carriage to procure feeding movement of the pick-up conveyor and means operable from the carriage for controlling swinging movement of the pick-up conveyor.

7. A loading machine including an elongated body frame a main longitudinal conveyor carried by said frame, a carriage movable over the frame, an annular turntable mounted on said carriage, a pick-up conveyor mounted at one side of the turntable and arranged to discharge therethrough, an engine mounted at the opposite side of the turntable, a main countershaft extending alongside of the engine and driven therefrom, a drive connection between one end portion of the shaft and the pick-up conveyor and means for propelling the carriage located laterally of the open central portion of the turntable and connected with the other end portion of the counter-shaft.

8. A machine of the class described including a main longitudinal means for conveying, a carriage movable along said means for conveying, a turntable on said carriage, a pick-up conveyor carried by said turntable, and means carried by and controlled from said turntable for propelling the carriage in either direction along the main means for conveying.

9. A machine of the class described including a main longitudinal means for conveying, a carriage movable along said means for conveying, a turntable on said carriage, a pick-up conveyor carried by the turntable and arranged to discharge to said main means for conveying, means for rotating the turntable and means carried by and operable from an operator's position on the turntable for propelling the carriage along the main means for conveying.

10. A machine of the class described, including an elongated main means for conveying, hoppers mounted for movement thereover and arranged to discharge thereto, a pick-up conveyor movable along the main means for conveying and having its discharge end portion arranged to discharge selectively into said hoppers, means for moving the pick-up conveyor, and means for releasably connecting the pick-up conveyor and hoppers for procuring simultaneous movements thereof.

11. A machine of the class described, including an elongated body frame, a longitudinal main conveyor carried by the frame, superposed tracks carried by the frame above the conveyor, a hopper carriage mounted on the lower tracks, a plurality of hoppers carried by said carriage, a conveyor carriage mounted on the upper tracks, and a pick-up conveyor on said carriage.

12. A machine of the class described including an elongated main means for conveying, hoppers mounted for movement thereover and arranged to discharge thereon, and a pick-up conveyor movable along the main means for conveying and having its discharge end portion arranged to discharge selectively into said hoppers, said pick-up conveyor being movable to either side of the main means for conveying.

13. A machine of the class described, including an elongated main means for conveying, hoppers mounted for movement thereover and arranged to discharge thereon, and a pick-up conveyor movable along the main means for conveying and arranged to discharge simultaneously into more than one of the hoppers and selectively into a plurality of the said hoppers.

14. A machine of the class described, including an elongated body frame, a longitudinal main means for conveying carried by the frame, a hopper carriage movable over said main means for conveying, pairs of transversely opposed hoppers carried by said carriage, and a pick-up conveyor movable along the body frame and having its discharge end portion arranged to selectively discharge into a pair of hoppers.

15. A machine of the class described including an elongated body frame, a longitudinal main means for conveying carried by the frame, a hopper carriage movable over said main means for conveying, pairs of transversely opposed hoppers carried by said carriage, a turntable mounted on the carriage, and a pick-up conveyor carried by the turntable and arranged to discharge therethrough selectively into a pair of hoppers.

16. A machine of the class described including an elongated body frame, a longitudinal main means for conveying carried by the frame, a hopper carriage movable over said main means for conveying, pairs of transversely opposed hoppers carried by said carriage, a pick-up conveyor movable along the body frame and having its discharge end portion arranged to selectively discharge into a pair of hoppers, and means for independently adjusting the capacities of the hoppers.

17. A machine of the class described including an elongated main means for conveying, hoppers mounted for movement thereover and arranged to discharge thereon, and a pick-up conveyor movable along the main means for conveying and having its discharge end portion arranged to discharge selectively into said hoppers, said hoppers having differential capacity for materials of different degrees of fineness.

18. A machine of the class described including an elongated main means for conveying, hoppers mounted for movement thereover and arranged to discharge thereon, a pick-up conveyor movable along the main means for conveying and having its discharge end portion arranged to discharge selectively into said hoppers, and capacity adjusting plates movably mounted in said hoppers, said plates being perforated whereby to admit fine material therethrough and to exclude passage of coarse material therethrough.

19. A loading machine including an elongated body frame, a main longitudinal conveyor mounted in the lower portion of the body frame, track sills at the sides of the body frame, a hopper structure mounted between the sides of the body frame and adapted to travel on the track sills, a central partition wall and outer side walls in the hopper structure forming transversely opposed hopper compartments, the lower edge of said central partition wall being disposed above the lower edges of the outer walls and hopper bottom plates hinged adjacent the lower edge of the central partition wall and inclined outwardly in oblique relation in closing position.

20. A machine of the class described including an elongated wheeled body frame, a longitudinal conveyor carried thereby, a power unit carried by the frame for driving said conveyor and propelling the frame, a carriage mounted on the body frame, a lateral conveyor carried by the carriage, and an independent power unit mounted on said carriage for driving said lateral conveyor.

21. A machine of the class described including an elongated wheeled body frame, a longitudinal conveyor carried thereby, a power unit carried by the frame for driving said conveyor and propelling the frame, a cariage mounted on the body frame, a lateral conveyor carried by the carriage, an independent power unit mounted on said carriage for driving said lateral conveyor, and means operable by said last named power unit for propelling said carriage on said frame.

22. A loading machine including an elongated body frame, a main longitudinal conveyor carried by said frame, a hopper carriage movable along said frame, a conveyor carriage, a pick-up conveyor on said conveyor carriage arranged to discharge to the hopper carriage, means for connecting said carriages for simultaneous movement, and means for moving each carriage.

23. A loading machine including an elongated body frame, a main longitudinal conveyor carried by said frame, a hopper carriage movable along the frame, a conveyor carriage, a pick-up conveyor on said conveyor carriage arranged to discharge to the hopper carriage, pulleys at the ends of the path of travel of the hopper carriage, means for moving the hopper carriage including a cable trained about said pulleys and secured to the hopper carriage, means for moving the conveyor carriage, and means for releasably securing the cable to the conveyor carriage, to procure simultaneous movement of the carriages.

24. A loading machine including an elongated body frame, a main longitudinal conveyor carried by said frame, a hopper carriage movable along said frame, a pick-up conveyor carriage movable along the frame, a turntable mounted on said carriage, a pick-up conveyor carried by the turntable and arranged to discharge to said main longitudinal conveyor, a wheel rotatably mounted on the conveyor carriage concentric with the axis of the turntable, a source of power on the turntable, a drive connection between said source of power, and the wheel, a member extending along the path of movement of the conveyor carriage and engaged with said wheel, a sheave rotatably mounted on the conveyor carriage, a drive connection between said source of power and the sheave, pulleys at the ends of the path of travel of the hopper carriage, and a cable secured to the hopper carriage and trained about the pulleys and engaged with said sheave.

25. A machine of the class described, including an elongated main means for conveying, a carriage movable therealong, a turntable on said carriage, a pick-up conveyor carried by said turntable and arranged to discharge to said main means for conveying, a primary power unit mounted on the turntable for driving said pick-up conveyor, a sheave on said carriage concentric with the axis of rotation of the turntable, a drive connection between said power unit and the sheave, and a flexible member engaging said sheave and extending along the main means for conveying.

26. A machine of the class described, including an elongated main means for conveying, a carriage movable therealong, a turntable on said carriage, a pick-up conveyor carried by said turntable and arranged to discharge to said main means for conveying, a primary power unit mounted on the turntable for driving said pickup conveyor, a wheel on said carriage concentric with the axis of the turntable, a drive connection between said wheel and the primary power unit and means engaging said wheel for procuring propulsion of the carriage.

27. In a structure of the class described, the combination of a trackway, a carriage movable along the trackway, a turntable on the carriage, a power unit on the turntable, a drive wheel on said carriage concentric with the axis of the turntable, a drive connection between said wheel and the power unit and a member extended along the trackway and engaging said drive wheel.

28. In a structure of the class described, the combination of a trackway, a carriage movable along said trackway and including a body member having inner and outer annular bearing wall portions, a turntable on the carriage having its axis concentric with said wall portions, annular members rotatably engaged with said bearing wall portions, a source of power on the turntable, drive connections between said source of power and the annular members, a member extending along the trackway and engaged with one of the annular members, a second carriage movable along the trackway under the first carriage, pulleys at the ends of the trackway, and a cable trained about said pulleys and engaged with the other annular member and having its ends secured to the second carriage.

29. In a structure of the class described, the combination of a trackway, a carriage movable along said trackway, a second carriage movable along the trackway over the first carriage, means for propelling the second carriage, a sheave on said second carriage, pulleys at the ends of travel of the first carriage, means carried by said second carriage for driving the sheave, and a cable wound on said sheave and trained about said pulleys and having its ends secured to the first carriage.

30. In a structure of the class described, the combination of a trackway, a carriage movable along said trackway, a second carriage movable along the trackway over the first carriage, means for propelling the second carriage, a sheave on said second carriage, pulleys at the ends of travel of the first carriage, means carried by said second carriage for driving the sheave, a cable wound on said sheave and trained about said pulleys and having its ends secured to the first carriage, and means for releasably connecting the cable with the second carriage to procure simultaneous propulsion of the carriages.

31. In a structure of the class described, the combination of a trackway, a carriage movable along said trackway, a second carriage movable along the trackway over the first carriage, means for propelling the second carriage, a turntable mounted on the second carriage, control means for said propelling means mounted on the turntable, a sheave carried by the second carriage, means carried by the second carriage and controlled from the turntable for driving said sheave, pairs of pulleys at the ends of travel of the first carriage, a cable secured at one end to an end of the first carriage and trained about one of the pulleys and extending longitudinally of the path of travel in a free stretch and trained about an opposite end pulley and then extending longitudinally of the path of travel and wound on the sheave and finally secured to the other end of the first carriage and clamp means carried by the turntable and slidably connected with the said free stretch of the cable, said clamp means being operable to secure the free stretch of the cable to the turntable whereby to procure simultaneous movement of the carriages.

32. In a structure of the class described, the combination of a trackway, a carriage movable along said trackway, a second carrige movable along the trackway over the first carriage, means for propelling the second carriage, a turntable mounted on the second carriage, control means for said propelling means mounted on the turntable, pulleys adjacent the end of the path of travel of the first named carriage, a cable trained about said pulleys and having its ends secured to the ends of the first named carriage, a sleeve member depending from the turntable and slidably connected with the cable and a plunger in said sleeve member for clamping the cable to procure simultaneous movement of the carriages.

33. A machine of the class described including a main longitudinal means for conveying, a carriage movable therealong, a pick-up conveyor frame having pivotal connection with the carriage for horizontal swinging movement, an endless bucket chain carried by said frame and arranged to discharge to said longitudinal means for conveying, means for procuring inching movement of the carriage to procure feeding movement of the pick-up conveyor and means controlling swinging movement of the pick-up conveyor.

34. A machine of the class described including a main longitudinal means for conveying, a carriage movable therealong, a turntable on the carriage, a pick-up conveyor having pivotal connection with the turntable for horizontal swinging movement and adapted for conveying engagement with a pile of work material in obliquely inclined position whereby said conveyor is urged outwardly from the main means for conveying upon such operative engagement of the conveyor, means for moving the carriage to procure operative engagement of the conveyor and means operable from the turntable for controlling horizontal pivotal movement of the pick-up conveyor whereby it may be permitted to swing outwardly during its conveying operation to convey transverse slices from the pile of material operated upon.

35. A machine of the class described including a main longitudinal means for conveying, a carriage movable therealong, a turntable on said carriage, a pick-up conveyor carried by said turntable and arranged to discharge to said main means for conveying, mechanism for propelling the carriage along the longitudinal means for conveying including a shaft mounted on the turntable, a source of power on the turntable, a drive connection between said source of power and the shaft for procuring propulsion of the carriage along the main longitudinal means for conveying to desired points of work and an inching feed connection between said source of power and the shaft for propelling the carriage to feed the pickup conveyor to the work material.

36. In a machine of the class described, the combination of a trackway, a carriage movable along said trackway, a turntable on said carriage, mechanism for propelling the carriage along the trackway including a shaft mounted on the turntable, a source of power on the turntable, a variable speed drive mechanism connected with said source of power and a reversible drive connection between said variable speed mechanism and the shaft.

37. In a machine of the class described, a longitudinal conveyor frame, a lower carriage, an upper carriage, and means carried by one carriage for propelling same and also the other carriage and to propel both carriages in fixed but adjustable relation.

38. In a machine of the class described, a longitudinal conveyor frame, a carriage movable along said frame, a turntable on the carriage, a lateral conveyor on the turntable, and means carried by said turntable and operable therefrom for horizontally swinging said lateral conveyor, for lowering and raising said conveyor and for propelling said carriage along said conveyor frame.

39. In a machine of the class described, a longitudinal conveyor frame, a hopper carriage movable along said frame, a conveyor carriage movable along said frame, a turntable on the carriage, a lateral conveyor on the turntable, and means carried by said turn table and operable therefrom for horizontally swinging said lateral conveyor, for raising and lowering said conveyor, for propelling said carriage along said conveyor frame, and for moving said hopper carriage in relation to the conveyor carriage.

In testimony that I claim the foregoing I have hereunto set my hand at Milwaukee, in the county of Milwaukee and State of Wisconsin.

HUGO O. STAMP.